J. F. M. PATITZ.
TRACTOR.
APPLICATION FILED MAR. 8, 1920.
1,419,113.
Patented June 6, 1922.
3 SHEETS—SHEET 2.
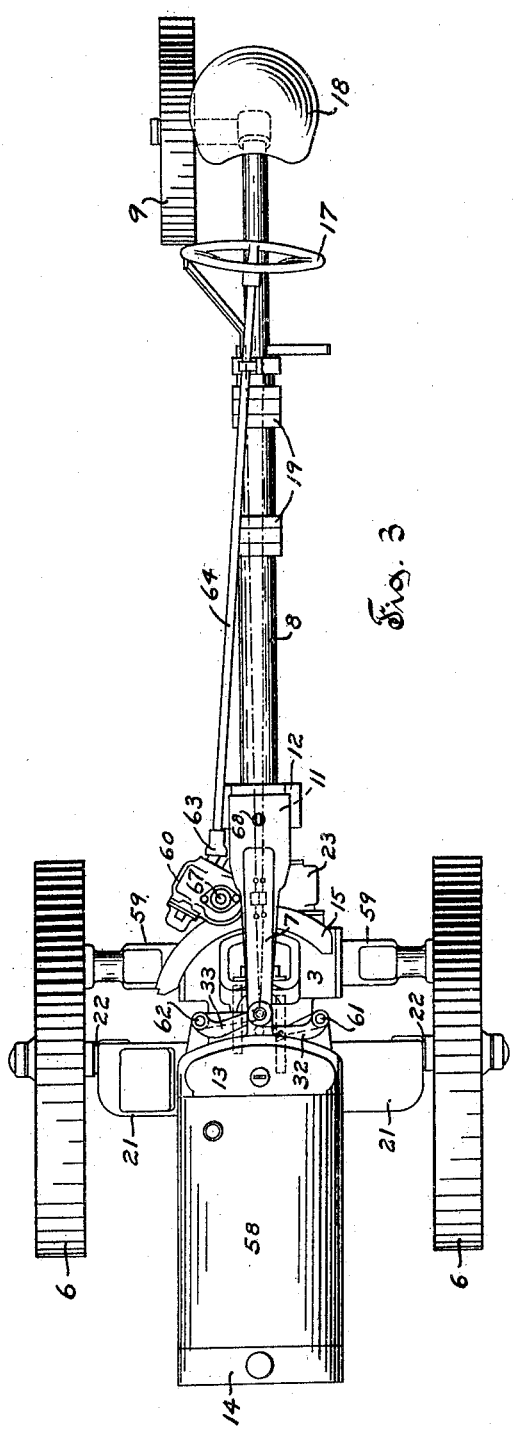
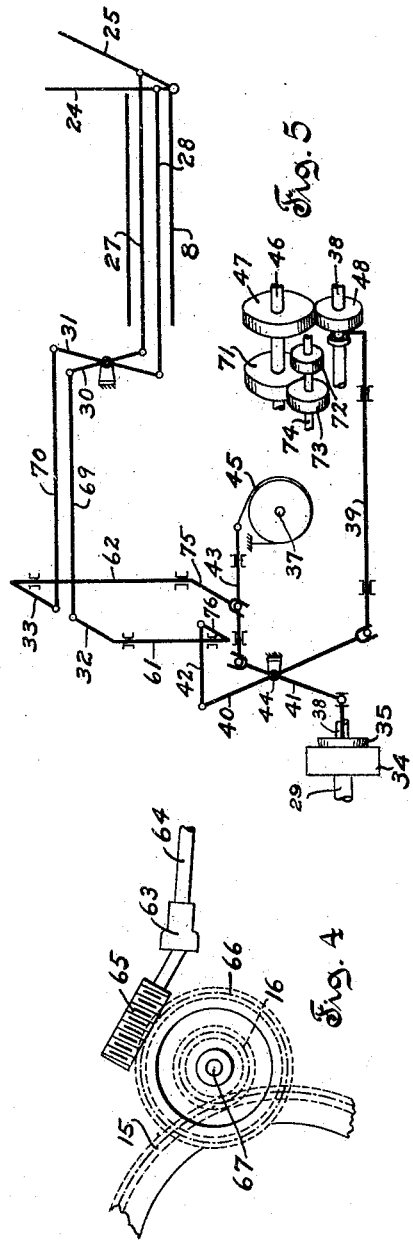

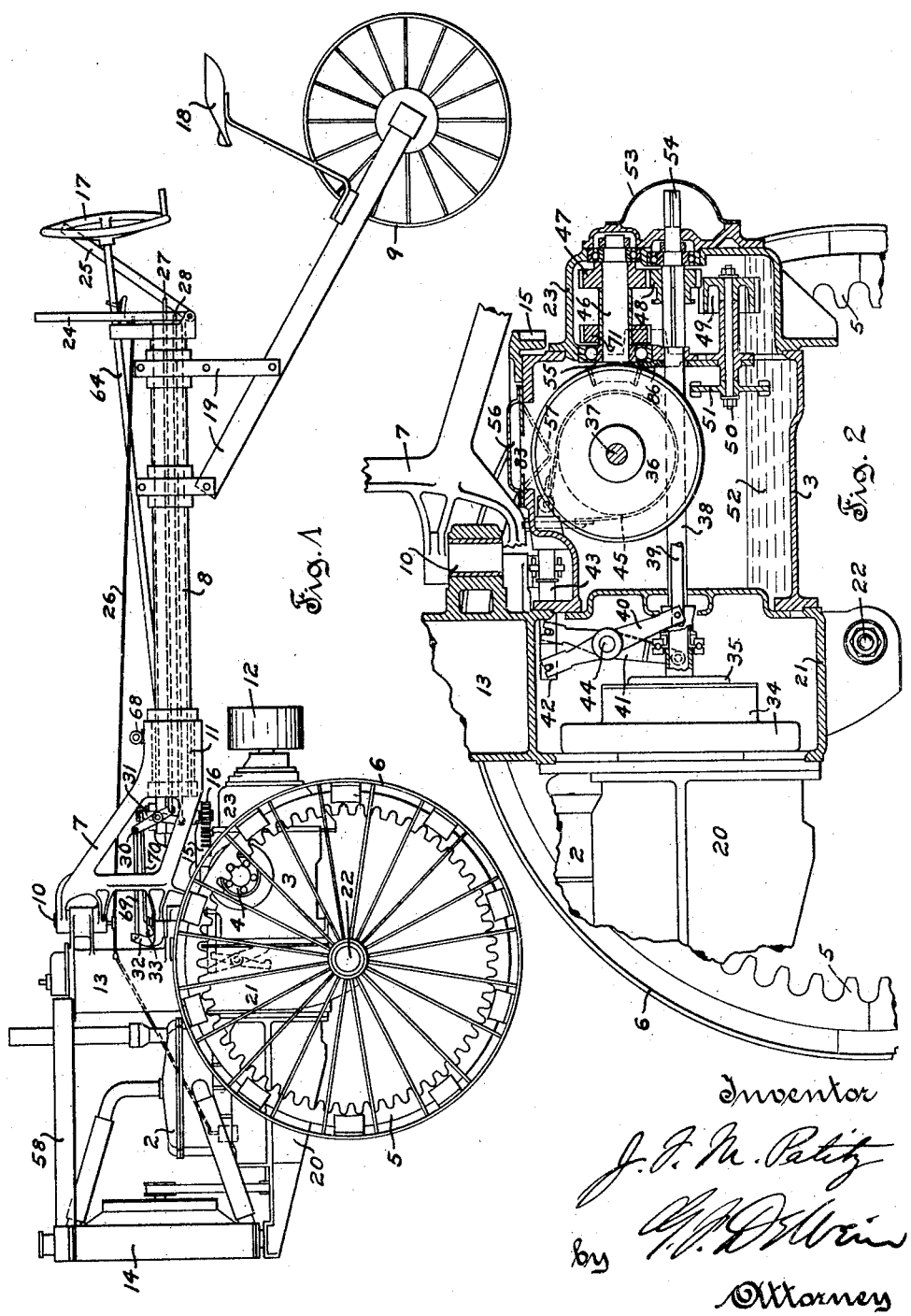

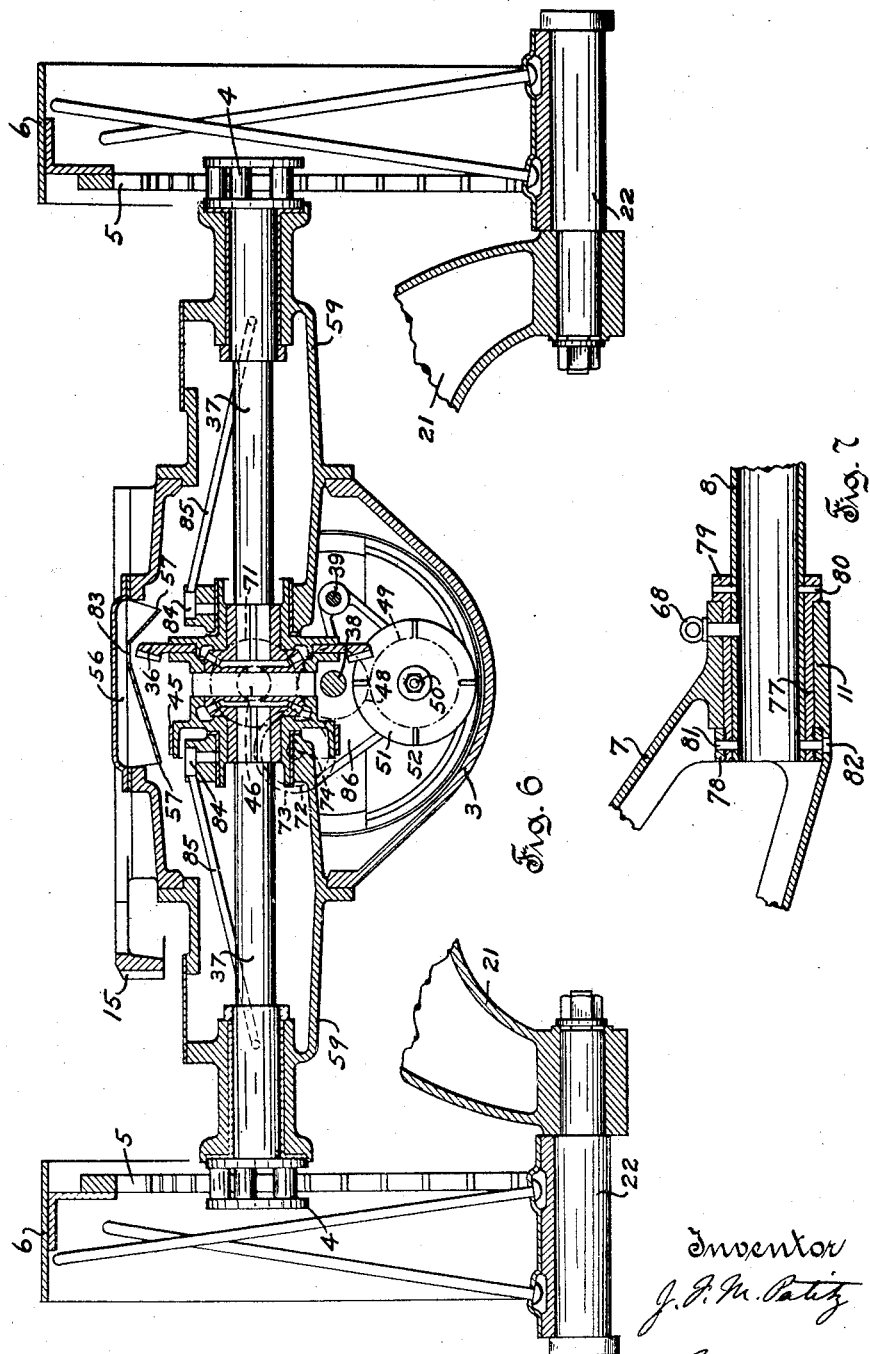

UNITED STATES PATENT OFFICE.

JOHANN FRIEDRICH MAX PATITZ, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

TRACTOR.

1,419,113.  Specification of Letters Patent.  Patented June 6, 1922.

Application filed March 8, 1920. Serial No. 364,319.

*To all whom it may concern:*

Be it known that JOHANN FRIEDRICH MAX PATITZ, a citizen of the United States, residing at Milwaukee, in the county of Milwaukee and State of Wisconsin, has invented a certain new and useful Improvement in Tractors, of which the following is a specification.

This invention relates in general to improvements in the art of constructing and manipulating vehicles, and relates more specifically to improvements in the construction and operation of farm tractors of the type in which a propelling motor is supported by a pair of drive wheels located on opposite sides of the motor, the vehicle thus formed being provided with means for interchangeably attaching various kinds of portable implements thereto.

An object of the invention is to provide a tractor which is simple in construction and efficient in operation. Another object of the invention is to provide an improved mode of operating and of manipulating tractors.

Some of the more specific objects of the present invention may be enumerated as follows:

To provide improved means for effecting interchangeable attachment of portable implements to a tractor. To provide simple and efficient means for enabling manipulation of a tractor while the operator is stationed adjacent a trailing implement. To provide a short-turn tractor. To provide means for permitting a trailing implement to vary its position in accordance with unevenness of the ground surface, without affecting the position of the propelling tractor. To provide a tractor which is simple, durable and mechanical in construction and which may be manufactured at minimum cost. To provide a compact tractor, various elements of which are enclosed, the enclosed elements being readily accessible for inspection, adjustment and removal. To provide simple means for permitting utilization of the motor of a tractor to drive stationary machinery. To provide means for automatically lubricating various parts of a tractor and for permitting efficient lubrication of other parts. To provide other improved features of tractor construction which will reduce to a minimum the cost of manufacture and which will increase to a maximum the efficiency of operation of the tractors.

A clear conception of an embodiment of the invention and of the manner of manipulating tractors constructed in accordance therewith, may be had by referring to the drawings accompanying and forming a part of this specification, in which like reference characters designate the same or similar parts in the various views.

Fig. 1 is a side elevation of a farm tractor.

Fig. 2 is an enlarged fragmentary longitudinal vertical section through the transmission housing of a tractor.

Fig. 3 is a plan view of a tractor.

Fig. 4 is a fragmentary enlarged plan view of the gearing for steering the tractor.

Fig. 5 is a diagrammatic perspective view of the manipulating and controlling mechanism.

Fig. 6 is an enlarged fragmentary transverse vertical section through the transmission housing and elements associated therewith.

Fig. 7 is an enlarged fragmentary longitudinal vertical section through the swivel connection between the yoke and the draught member of the tractor.

The tractor comprises in general a motor 2, transmission mechanism located rearwardly of the motor and enclosed within a housing 3, a pair of propelling wheels 6 located on opposite sides of the motor, gearing operatively connecting the transmission mechanism with the propelling wheels, and a rearwardly extending tubular member 8 associated with the tractor and serving as means of attachment of trailing implements to the tractor.

The motor 2 which as illustrated is of the internal combustion type but which may be any other desirable type, is provided with a lower crank casing 20. This crank casing 20 is rigidly secured to the forward end of an intermediate frame 21 the rear of which is rigidly secured to the transmission housing 3, see Figs. 1 and 2. The rear portion of the transmission housing 3 is provided with a detachable rear cap 23, the housing 3 and cap 23 forming an enclosure for the transmission gearing. It will be noted that the motor 2, crank case 20, intermediate frame 21, transmission housing 3, and cap 23 form the frame structure of the tractor. The lower portion of the intermediate frame 21 is provided with a pair of opposed laterally and downwardly extending projections to which the stub axles 22 forming supports for the wheels 6, are rigidly secured. Extending upwardly from the upper portion of and formed integral with the intermediate frame 21, is a fuel supply tank 13 which has rearwardly extending parallel vertically spaced lugs formed integral therewith. The forward end of the crank casing 20 is provided with an extension forming a support for the radiator 14 and the cooling fan. The upper extremity of the radiator 14 is connected with the upper extremity of the fuel supply tank 13 by means of a hood 58 which forms a cover for the motor 2.

A laterally swingable yoke 7 is mounted upon vertically alined pivots 10 associated with the lugs at the rear of the fuel supply tank 13, the axis of these pivots being located slightly to the rear of the axis of the axles 22. This yoke 7 extends rearwardly and downwardly being provided with a hub 11 at its rear extremity. A horizontal tubular member 8 has its forward end pivotally associated with the hub 11 of the yoke 7, this tubular member 8 serving as a draught member for permitting interchangeable attachment of portable implements to the tractor. As illustrated in the drawings, a rear supporting wheel 9 is attached to the tubular member 8 by means of structural elements 19 which besides connecting the rear wheel mounting rigidly to the member 8, provide a support for the operator's seat 18. The tubular member 8 besides serving as a draught member and steering element provides a mounting for the operating levers 24, 25, the steering mechanism, and the engine control mechanism 26, and serves as a housing for the operating rods 27, 28. The yoke 7 and the elements associated therewith are normally prevented from swinging about the vertical pivots 10 by means of a segmental rack 15 secured to the transmission housing 3, and a pinion 16 associated with the yoke. The pinion 16 is secured to the lower end of a vertical shaft 67 which is mounted in a gear box 60 detachably secured to the side of the yoke 7, see Figs. 3 and 4. A worm wheel 66 secured to the upper extremity of shaft 67 meshes with a worm 65 which is drivingly connected through a universal joint 63 with the steering rod 64, this worm gearing providing an adjustable lock for preventing free articulation of the draught beam relatively to the tractor. The steering rod 64 is mounted in a bearing associated with the tubular member 8 and has the steering hand wheel 17 secured to the rear extremity thereof. The axis of the shaft to which the worm 65 is secured, is set at an angle of about 45° relatively to the axis of the tubular member 8, thereby permitting location of the rod 64 close to the member 8, and also providing the necessary clearance between the wheel 6 and the gear box 60 during turning of the tractor.

The driving motor 2 has a plurality of vertical cylinders provided with pistons which are operatively associated with the engine crank shaft 29 in the usual manner. The rear end of the crank shaft 29 is provided with a fly-wheel 34 forming one element of the main clutch, see Figs. 2 and 5. The clutch element 35 is longitudinally movable relatively to the main engine shaft 29 and is associated with the forward end of the horizontal main transmission shaft 38. The main transmission shaft 38 extends longitudinally of the tractor and is mounted in suitable bearings within the frame element 21 and the cap 23. An axially movable transmission gear 48 is drivingly associated with the shaft 38 by means of a spline, this gear 48 being slidable along the shaft 38 by means of a rod 39. During forward propulsion of the tractor, the gear 48 meshes with a gear 47 mounted upon a counter-shaft 46 located above and extending parallel to the main transmission shaft 38. During reverse propulsion of the tractor the gear 48 meshes with a gear 72 carried by a counter-shaft 74 to which is secured a second gear 73 which meshes with a gear 71 secured to the counter-shaft 46. The spacing of the gears 47, 72 longitudinally of the tractor, is such that the gear 48 upon being shifted from either extreme position is first brought to a position wherein it does not mesh with either of the gears 47, 72. The gears 72, 73 and the shaft 74 are supported in bearings in a bracket 86 as shown in Fig. 6.

The forward extremity of the counter-shaft 46 is provided with a bevel pinion 55 which meshes with the driving gear of a differential 36. The differential 36 is associated with the half-shafts 37 which are supported in detachable bearing elements 59 extending laterally from opposite sides of the transmission housing 3, see Fig. 6. The outer extremity of each of these half-shafts 37 is provided with a bull pinion 4 which meshes with an internal gear 5 secured to the adjacent drive wheel 6.

The casing of the differential 36 is provided with a brake 45 which is operable simultaneously with but reversely of the main clutch 34, 35 by means of a connection 43. The connection 43 is mounted in horizontal bearings, having its opposite ends secured to the brake 45 and to the lever 41 respectively, and having its medial portion connected with the end of a horizontally swingable arm 75. The lever 41 is provided at its medial portion with a stationary pivot 44 and has its lower extremity associated with the movable clutch member 35 through a short horizontal connection. The horizontally swingable arm 75 is secured to the lower extremity of a vertical pivot shaft 62 to the upper extremity of which a horizontally swingable arm 33 is secured. The arms 75, 33 are substantially parallel to each other and extend in the same direction relatively to the pivot shaft 62. The swinging extremity of the arm 33 is connected to the upper extremity of a lever 31 by means of a horizontal connecting rod 70. The lever 31 has its medial portion pivoted upon the yoke 7 and has its lower extremity connected with the combined clutch and brake lever 24 at the rear of the member 8, by means of a rod 28 located within the tubular member 8.

The shiftable gear 48 as previously stated is movable by means of a horizontal rod 39, the forward extremity of which is connected to the lower extremity of a lever 40. The medial portion of the lever 40 is provided with a stationary pivot 44 while the upper extremity of the lever 40 is connected to the swinging end of a horizontally swingable arm 76 by means of a connection 42. The arm 76 is secured to the lower extremity of a vertical pivot shaft 61 to the upper extremity of which is secured a horizontally swingable arm 32. The arms 76, 32 are substantially parallel to each other and extend in the same direction relatively to the pivot shaft 61. The swinging extremity of the arm 32 is connected to the upper extremity of a lever 30 by means of a horizontal connecting rod 69. The lever 30 is pivoted at its medial portion to the yoke 7 and has its lower extremity connected with the gear shift lever 25 at the rear of the member 8, by means of the rod 27 located within the tubular member 8.

In order to permit a trailing implement to tilt laterally in accordance with variations in the ground level, the tubular member 8 to which the implement is rigidly attached is permitted to swing about its horizontal axis. Such swinging of the member 8 is effected by virtue of the connection of the forward extremity of the member 8 to the rear hub 11 of the yoke 7. This pivotal connection is shown in detail in Fig. 7, and comprises a sleeve 77 rigidly attached to the tubular member 8 by means of transverse pins 80 which penetrate the member 8 and a thrust flange 79 formed integral with the rear end of the sleeve 77. The forward end of the sleeve 77 is provided with a removable thrust collar 78 which is rigidly attached to the sleeve 77 by means of transverse pins 81 which penetrate the collar 78, sleeve 77 and member 8. The pins 81 are insertable and removable through a lower opening 82 in the yoke 7. The outer surface of the cylindrical sleeve 77 coacts with a bore in the hub 11 the adjacent end surfaces of the flange 79 and collar 78 coacting with end surface of the hub 11 for the purpose of taking up relative end thrust. When it is desired to utilize an end carriage or implement provided with but a single rear supporting wheel 9 as shown, it is preferable to provide some means for locking the member 8 to the yoke 7. The locking pin 68 is provided for this purpose and extends through alined opening in the hub 11, sleeve 77 and member 8. When a trailing carriage or implement having more than one supporting wheel is employed the locking pin 68 is omitted thus permitting free swiveling of the member 8 within the hub 11 of the yoke.

In order to permit utilization of the motor 2 to drive a stationary mechanism, the rear portion of the main transmission shaft 38 is provided with a squared portion 54 adapted for attachment of a driving pulley 12 thereto, see Figs. 1 and 2. If it is desired to utilize the pulley 12 for driving purposes, the main transmission shaft 38 may be connected directly to the engine crank shaft 29 by means of the main clutch 34, 35 and the gear 48 shifted to inoperative position between the gears 47, 72. With the mechanism thus adjusted the entire power of the motor 2 may be utilized for driving the pulley 12. The pulley 12 may be removed from the end portion 54 of the shaft 38 and this shaft end protected by means of an enclosing cover 53 as shown in Fig. 2.

The transmission mechanism is effectively automatically lubricated by means of a splasher rotor 51 mounted upon a horizontal shaft 50 supported in a bearing in the lower portion of the transmission housing. The splasher rotor 51 extends downwardly into the oil basin 52 at the bottom of the transmission housing 53 and is rotatable by means of a gear 49 secured to the shaft 50, this gear 49 at all times meshing with the shiftable gear 48. The gear 49 is of sufficient width to maintain intermesh with the gear 48 regardless of the position of adjustment of the latter. During normal operation of the engine, the rotor 51 throws oil from the basin 52 upwardly against the various elements within the transmission housing. The gear of the differential 36 carries oil which is deposited thereon, upwardly and delivers it through the opening 83 at the top of the housing 3 into the oil cap 56 from whence the oil flows along the oil gutters 57 to the oil pockets 84. From the pockets 84 oil flows by gravity directly to the bearings of the differential and through oil pipes 85 to the outer bearings of the half-shafts 37 and to the bull pinions 4.

During normal forward propulsion of the tractor, the motor 2 is operating to drive its crank shaft 29 which is acting through the main clutch 34, 35 to drive the main transmission shaft 38. The gear 48 is in the position shown in Figs. 2 and 5, and is driving the differential 36 through the gear 47, counter shaft 46 and pinion 55. From the differential 36 rotary motion is transmitted through the half-shafts 37 to the bull pinions 4 which mesh with the internal gears 5 of the driving wheels 6 and cause these wheels to rotate in an anti-clockwise direction as viewed in Fig. 1.

During reverse propulsion of the tractor the transmission gear 48 is shifted along the shaft 38 and meshes with the idler pinion 72, shown in Fig. 5. The rotary motion of the shaft 38 is then transmitted in a reverse direction to the differential 36 through the pinion 72, counter shaft 74, gears 73, 71, counter shaft 46 and pinion 55. The reverse motion of the differential 36 is transmitted through the half-shafts 37 to the bull pinions 4 and from thence through the internal gears 5 to the driving wheels 6, causing these wheels to turn in a clockwise direction as viewed in Fig. 1.

Shifting of the gear 48 from forward to reverse and vice versa, is effected by manipulation of the lever 25 at the rear end of the tubular member 8. If it is desired to stop the tractor suddenly it is necessary to manipulate the lever 24 mounted at the rear end of the tubular member 8. By pulling this lever 24 rearwardly the movable clutch member 35 is withdrawn from the clutch member 34 thereby interrupting the driving connection between the crank shaft 29 and the transmission shaft 38. Simultaneously with this release of the driving connection, the brake 45 associated with the casing of the differential 36, is set, thereby preventing further simultaneous rotation in the same direction, of the half shafts 37 and bull pinions 4. The tractor may also be stopped, but not positively, by manipulation of the lever 25 to interrupt the intermesh between the gear 48 and the adjacent gears 47, 42. With such disposition of the gear 48 there will be no positive rotation imparted from the motor 2 to the half-shafts 37 and pinions 4.

If it is desired to steer the tractor, it is necessary to manipulate the hand wheel 17 in the proper direction, thus causing the draught member 8 and the yoke 7 to swing horizontally relatively to the frame of the tractor, about the vertical pivots 10. Such relative swinging is effected by virtue of the intermesh between the gear 16 mounted upon the yoke 7 and the rack 15 secured to the tractor frame. The worm gearing 65, 66 provides a lock-geared connection between the draught member 8 and yoke 7, and the tractor frame so that articulation of the draught member 8 relatively to the propelling unit of the tractor in a horizontal plane can only be effected by manipulation of the steering wheel 17.

If during propulsion of a trailing implement by the tractor, the implement engages an obstruction on the ground which tends to cause lateral tilting of the implement, such tilting is readily permitted by the horizontal swivel connection between the forward end of the draught member 8 and the hub 11. Such tilting with the resulting swiveling of the member 8 will not affect the forward portion of the tractor, the position of which may also change in accordance with variations in the ground level without affecting the position of the trailing implement. During such relative lateral displacement of the propulsion unit and the trailing implement, the tractor manipulating rods and the levers associated therewith are subjected to a slight twisting action, such twisting being accommodated by the looseness in the joints between the ends of the rods and the associated elements. The effect of this twisting is also minimized by locating the manipulating rods 27, 28 as near to the axis of the tubular member 8 as possible. The disposition of the gear casing 60 so as to place the universal joints 63 as near to the tubular member 8 as possible provides the necessary clearance for turning and also reduces objectionable effects on the steering rod 64, resulting from displacement of the tubular member 8 and the yoke 7.

It will be noted that during rotation of the shaft 38 and regardless of the position of the gear 48, the gear 49, shaft 50 and splasher 51 will be rotated, thereby causing the splasher to throw oil upwardly within the transmission housing 3. The oil thus whirled against the moving transmission elements will effectively lubricate these elements, some of this oil being eventually thrown by the differential drive gear, through the opening 83 into the upper cap 56. This oil flows down the gutters 57 into the oil pockets 84 from which it flows by gravity and effectively lubricates the bearings of the half-shafts 37 and the bull pinions 4.

By utilizing the engine frame and the transmission housing as a support for the various tractor elements, the necessity of providing a separate frame structure for this purpose is avoided. The formation of the fuel supply tank 13 directly upon the intermediate frame 21 eliminates the necessity of providing special attachments for this element and also provides efficient means of attachment of the draught member 8 and yoke 7 to the propulsion unit of the tractor. The entire structure is formed of pleasing appearance with all parts readily accessible for inspection and removal of parts. The motor is located forwardly of the driving wheels 6 and has all sides exposed for inspection. The construction of the intermediate frame 21 is such that the tractor parts are placed at a sufficient height above the ground to permit utilization of the tractor for cultivating and other purposes where intermediate ground clearance is a necessity. The relatively frail parts are protected from the weather and against injury by means of suitable hoods or caps. The location of the operating rods 27, 28 within the tubular member 8 forms a protection for these rods and insures proper manipulation of the tractor at all times. The location of the swivel connection between the member 8 and the yoke 7 within the hub 11 of the latter, provides a protection against injury of this connection thus insuring proper self-adjustment of the propulsion unit and the trailing implement and avoiding breakage of interconnecting parts.

It should be understood that it is not desired to limit the invention to the exact details of construction and operation herein shown and described, for obvious modifications may occur to persons skilled in the art.

It is claimed and desired to secure by Letters Patent:

1. In a tractor, a propelling unit, an element associated with said unit and swingable laterally thereof upon a vertical pivot, a tubular draft member secured to and swinging with said element, and controlling elements for said power unit located within said tubular member.

2. In a tractor, a propelling unit, a tubular draft member, a vertical pivotal connection between said member and said unit, and controlling elements for said unit located within said tubular member.

3. In a tractor, a propelling unit, a tubular draft member, controlling levers for said unit mounted upon said tubular member, and connections between said levers and the controlling elements of said unit, said connections being located within said tubular member.

4. In a tractor, a propelling unit having a frame and a fuel supply tank formed in one with said frame, a swingable element extending away from said unit, a vertical pivotal connection between said element and said supply tank, a beam member extending away from said element, and a horizontal pivotal connection between said element and said member.

5. In a tractor, a propelling unit having a frame and a fuel supply tank formed in one, a swingable element extending away from said unit, and a vertical pivotal connection between said element and said fuel supply tank.

6. In a tractor, a power unit, an element extending away from said unit, a vertical pivotal connection between said element and said unit, controlling devices for said unit mounted upon said element, devices to be controlled mounted upon said unit, and connections between said controlling and controlled devices, said connections including a pivot shaft carried by said unit and having a pair of laterally projecting spaced arms movable therewith and connected to said controlling and said controlled device respectively.

7. In a tractor, a power unit, an element extending away from said unit, a vertical pivotal connection between said element and said unit, controlling devices for said unit mounted upon said element, devices to be controlled mounted upon said unit, and connections between said controlling and controlled devices, said connections including a vertical pivot shaft carried by said unit and having upper and lower laterally projecting oscillatory arms connected to said controlling and said controlled device respectively.

8. In a tractor, a power unit, an element extending away from said unit, a vertical pivotal connection between said element and said unit, controlling devices for said unit mounted upon said element, devices to be controlled mounted upon said unit, and connections between said controlling and controlled devices, said connections including a pair of parallel vertical pivot shafts carried by said unit, each having upper and lower laterally projecting oscillatory arms connected to said controlling and said controlled device respectively.

9. In a tractor, a power unit, an element extending away from said unit, a vertical pivotal connection between said element and said unit, a gear segment associated with said unit and having an axis coaxial with said pivot, a pinion meshing with said gear segment, said pinion having an axis located to one side of said element, a gear box associated with said element and supporting said pinion, a worm wheel for communicating motion to said pinion, said worm wheel having an axis extending at an angle relatively to the longitudinal axis of said element, and means mounted on said element for manipulating said worm wheel.

10. In a tractor, a pair of substantially coaxial drive wheels, a motor secured to said wheels at one side of the vertical plane of the axes of said wheels, a transmission housing secured to said wheels at the opposite side of said vertical plane, the weight of said motor being substantially balanced by the weight of said transmission housing and of the mechanism therein, and a liquid fuel supply tank located in said plane between said motor and said transmission housing.

11. In a tractor, a pair of drive wheels, an intermediate frame supported by said wheels, a motor secured to the forward end of said frame, a transmission housing secured to the rear end of said frame, and a fuel supply tank for said motor formed integral with said frame.

12. In a tractor, a pair of coaxial drive wheels, a frame member supported between said wheels and above the axial center thereof, a motor secured to said frame midway between said drive wheels, and a fuel supply tank for said motor formed integral with the upper portion of said frame.

13. In a tractor, a pair of substantially coaxial drive wheels, an intermediate frame supported by said wheels in the plane of the axes of said wheels, a motor secured to the forward end of said frame, a transmission housing secured to the opposite end of said frame, the weight of said motor being substantially balanced by the weight of said transmission housing and the elements therein and the weight of said intermediate frame being substantially balanced about the axes of said wheels, and a liquid fuel supply tank associated with said intermediate frame.

14. In a tractor, a power unit, a wheel at the side of said unit, an element extending rearwardly of said unit, gearing for moving said element relatively to said unit and toward said wheel, a pair of connected rods for actuating said gearing, and a universal connection between said rods, the axes of said rods being set at an angle to each other to provide clearance for said wheel during movement of said element.

15. In a tractor, a power unit, a tubular draft member vertically pivotally associated with and extending away from said unit, and a controlling element for said unit located within said tubular member.

16. In a tractor, a power unit, a tubular draft member vertically pivotally associated with and extending away from said unit, and a controlling element for said unit supported by and located within said tubular member.

17. In a tractor, a power unit, a tubular draft member vertically pivotally associated with and extending away from said unit, controlling elements for said unit supported by and located within said tubular member, and means other than said unit for supporting said tubular member.

18. In a tractor, a tractor unit, a tubular member connected to said unit on a horizontal pivot and extending away from said unit, and controlling elements for said unit located within said member and in close proximity to the axis of said horizontal pivot.

19. In a tractor, a power unit, a tubular member associated with said unit on horizontal and vertical pivots and extending away from said unit, and controlling elements for said unit located within said member and in close proximity to the axis of said horizontal pivot.

20. In a tractor, a power unit, an element connected to said unit on a vertical pivot, a tubular member connected to said element on a horizontal pivot, and controlling elements for said unit located within and supported by said tubular member.

21. In a tractor, a power unit, a tubular member vertically pivotally associated with and extending away from said unit, controlling elements for said unit located within said member, devices to be controlled mounted upon said unit, and connections between said controlling elements and said controlled devices, said connections including a shaft parallel to the axis of said vertical pivotal connection and a pair of spaced arms secured to said shaft and associated with one of said elements and with one of said devices.

22. In a tractor, a tractor unit, a tubular member connected to said unit on a horizontal pivot and extending away from said unit, controlling elements for said unit located within said member and in close proximity to the axis of said horizontal pivot, devices to be controlled mounted upon said unit, and connections between said controlling elements and said controlled devices, said connections including a shaft perpendicular to the axis of said horizontal pivotal connection and an arm secured to said shaft and having at its end a pivot parallel to said shaft.

23. In a tractor, a power unit, a tubular member associated with said unit on horizontal and vertical pivots and extending away from said unit, controlling elements for said unit located within said member and in close proximity to the axis of said horizontal pivot, devices to be controlled mounted upon said unit, and connections between said controlling elements and said controlled devices, said connections including a shaft parallel to the axis of said vertical pivotal connection and a pair of spaced arms secured to said shaft and associated with one of said elements and with one of said devices.

24. In a tractor, a power unit, a tubular member vertically pivotally associated with and extending away from said unit, controlling elements for said unit located within said member, devices to be controlled mounted upon said unit, and connections between said controlling elements and said controlled devices, said connections including a shaft parallel to the axis of said vertical pivotal connection and an arm secured to said shaft and having at its end a vertical pivot parallel to said shaft.

In testimony whereof, the signature of the inventor is affixed hereto.

JOHANN FRIEDRICH MAX PATITZ.